G. N. SCOTT.
ADJUSTABLE RESISTANCE DEVICE FOR THE REBOUND OF VEHICLE SPRINGS.
APPLICATION FILED OCT. 28, 1907.
915,227.  Patented Mar. 16, 1909.
2 SHEETS—SHEET 1.
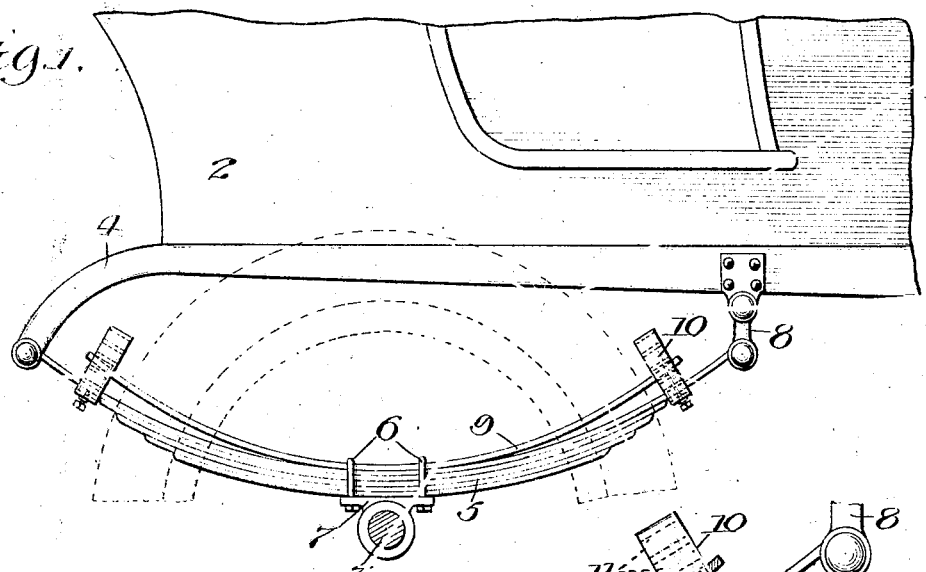
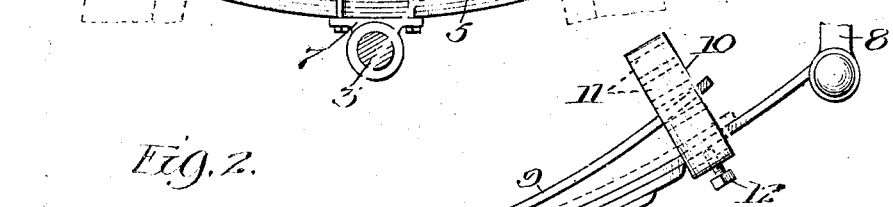
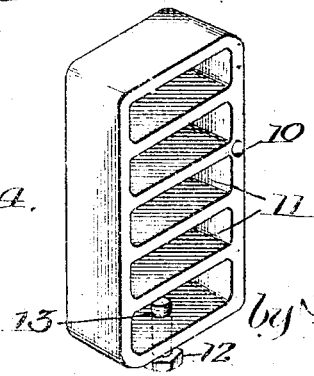
Witnesses:
Inventor
George N. Scott
by Frank Thompson
Atty G. N. SCOTT.
ADJUSTABLE RESISTANCE DEVICE FOR THE REBOUND OF VEHICLE SPRINGS.
APPLICATION FILED OCT. 28, 1907.
915,227.
Patented Mar. 16, 1909.
2 SHEETS—SHEET 2.
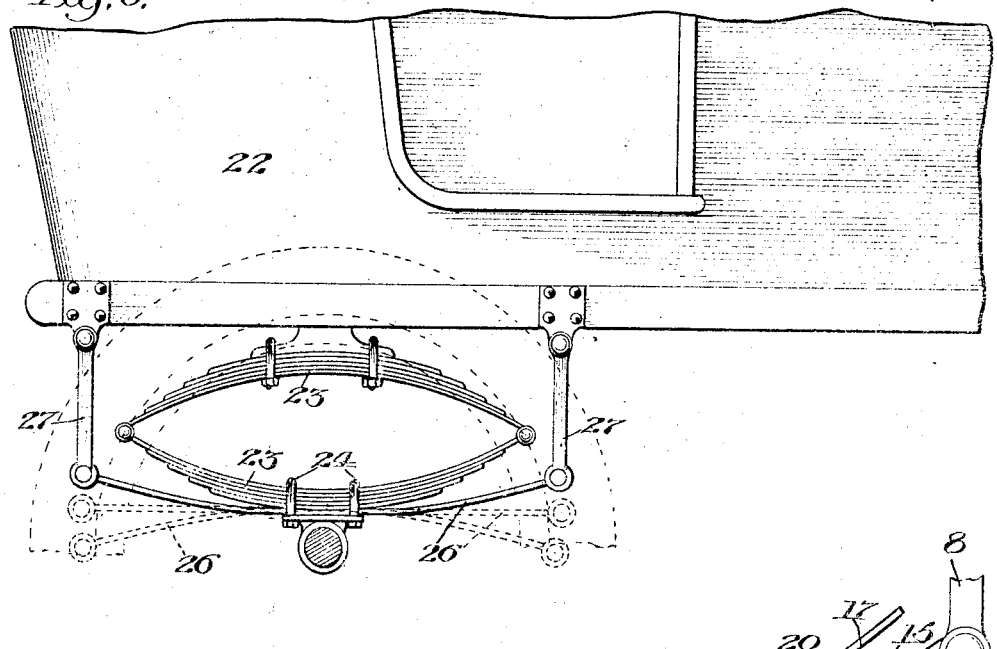
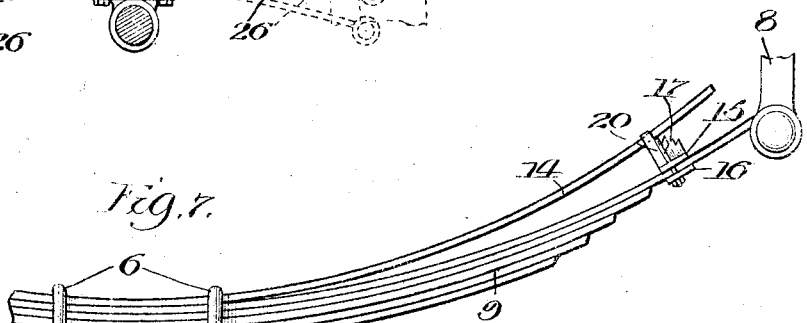
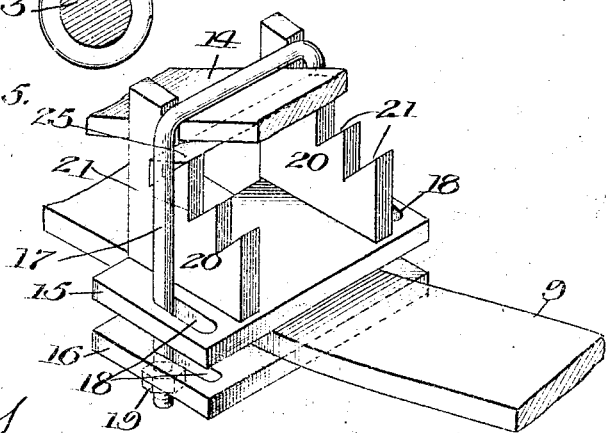
Witnesses:
Inventor
George N. Scott

UNITED STATES PATENT OFFICE.

GEORGE N. SCOTT, OF CHICAGO, ILLINOIS.

ADJUSTABLE RESISTANCE DEVICE FOR THE REBOUND OF VEHICLE-SPRINGS.

No. 915,227.    Specification of Letters Patent.    Patented March 16, 1909.

Application filed October 28, 1907. Serial No. 399,442.

*To all whom it may concern:*

Be it known that I, GEORGE N. SCOTT, a citizen of the United States, and a resident of Chicago, in the county of Cook and State of Illinois, have invented certain new and useful Improvements in Adjustable Resistance Devices for the Rebound of Vehicle-Springs, of which the following is a full, clear, and exact description.

In road vehicles such as carriages and automobiles flexible springs are placed between the body of the vehicle and the axle so as to allow the occupants to ride smooth over ordinary rough places. These springs of necessity must be elastic and resilient, and when a deep rut or a sudden elevation is encountered by the wheel the action and reaction of the springs subject the occupants to considerable jarring and shaking owing to the sudden return to normal conditions.

It is the object of my invention to provide suitable means that will prevent this sudden jar or shock and yet leave the springs in such condition that their resiliency will be unimpaired.

Another object of my invention is to provide a device the use of which requires no alterations in the construction of the vehicle spring in order to apply or remove the same, which can be easily and quickly done.

My invention has been found to be especially applicable to automobiles on account of the sudden jars received from uneven roadways and the great speed at which they travel and when applied to such vehicle does not detract from the efficiency of the spring but rather increases the same and lengthens the life thereof. This I accomplish by the means hereinafter fully described and as particularly pointed out in the claims.

In the drawings:—Figure 1 is a fragmental side elevation of the rear of an automobile or other vehicle body having my invention applied to the rear spring thereof. Fig. 2 is a detail view of a portion of the spring drawn to an enlarged scale. Fig. 3 is a similar view showing a slightly different manner of applying my invention to the spring. Fig. 4 is an enlarged perspective view of the spreader-plate used in connection with my invention. Fig. 5 is a perspective view of a modified device for spreading the springs. Fig. 6 is a fragmental view similar to Fig. 1 showing a modification of my invention. Fig. 7 is a view similar to Fig. 2 illustrating the manner of applying the clip shown in Fig. 5 of the drawings.

Referring to the drawings, 2 represents the body portion of an automobile, and 3 is the rear axle thereof. The side-sills 4 of the body preferably extend slightly beyond the rear of the same and are bent downward to adapt them to meet and be secured to the rear reach of the longer leaf of semi-elliptical vehicle-springs 5. These springs comprise one or more leaves and are, preferably, clamped about midway their length to the axle by means of suitable inverted U-shaped clips 6 near the journals 7 of the axles, while the ends thereof are preferably secured by means of suitable links 8 to the side-sills of the vehicle. There is always a certain position of the spring 5 in which it will be in a state of rest. This position will hereinafter be referred to as its normal position. My improved means for absorbing the shock or jar caused by the motion of these springs consists in securing an auxiliary spring 9 made of one or more leaves about their centers of length by the clips 6 that extend in the same direction as the vehicle-springs 5. The tension of the auxiliary spring is normally less than the tension of the vehicle-spring 5, but has its tension increased by having its ends separated and bent away from said springs 5 a suitable distance by means of a suitable spreader 10. In Fig. 4 of the drawings this spreader is shown to consist of a substantially rectangular shaped plate which is provided with a plurality of transverse slots or openings 11. The long leaf of the vehicle-spring is passed through the lowermost one of these openings and held therein by means of a set-screw 12 tapped through opening 13 in the lower end of the plate which prevents the latter from tipping. The ends of the auxiliary spring 9 are then separated from the vehicle-spring and inserted into one of the remaining slots 11 and there retained according to the degree of resisting tension it is desired the resisting spring should have.

In the modified arrangement illustrated in Fig. 3 of the drawings the auxiliary-spring 14 is placed below the lowermost leaf of the vehicle-spring and held by the clip while the spreader-plate is disposed on the longer leaf in a direction the reverse of that above described.

It will be understood that instead of arranging either auxiliary spring 9 or 14 (according to which kind is used) above or below the vehicle spring they can be placed alongside of the latter, on either side, and clipped directly or indirectly to the axle.

In Fig. 5 of the drawings I show a modified construction of the spreader. This modification comprises an upper and lower clip-bar 15 and 16 between which the longer leaf of the vehicle-spring 5 is held and clamped, and comprises an inverted U-shaped yoke 17 the screw-threaded ends of which pass through openings 18 in said bars, and are secured by nuts 19 screwed thereon, which securely clamp the parts together. The outer face of said bar nearest the auxiliary spring is provided with a pair of parallel lugs 20, 20, that project at right angles to the same and have inclined graduated steps 21, 21, upon their upper edge. The treads of these steps are adapted to seat a bridge 25 which affords a suitable support for the free ends of the auxiliary spring, substantially as shown, and upon which the latter is securely held by the horizontal portion or bend of the yoke 17 which passes over it.

The modification of my invention, illustrated in Fig. 6 of the drawings, is adapted to be applied to a vehicle 22 employing elliptical vehicle springs 23, the upper arch of which is secured to the under portion of its body while the under arch is secured by suitable clips 24 to the axle thereof. Secured, preferably, below the under arch is an auxiliary-spring 26, extending in the same direction as the elliptical-spring, whose normal shape would be approximately that shown in dotted lines in the drawing. This auxiliary-spring 26 is, however, slightly longer than the longest leaf of the elliptical spring 23 and its ends are pushed down under tension away from the vehicle body by means of suitable links 27 pivotally secured thereto and to the underframing or side-sills of the carriage. Under these conditions its tension is exerted in a direction away from the vehicle and against the vehicle-spring. Links 27 may, if desired, be constructed similar to the spreader-plates 10 by slotting the same transversely to seat the auxiliary-spring, but this, however, is not essential as the adjustment of the tension may be accomplished by making the auxiliary springs longer or shorter according as desired.

In operation when the wheel strikes any unevenness in the road, and the vehicle springs are suddenly compressed, such compression is resisted and their return to normal is compensated or equalized by the tension of the auxiliary-springs, which latter exert their force to resist the compression of the springs, but do not oppose the return of the same to their state of rest or equilibrium.

What I claim as new is:—

1. The combination with springs for vehicles, of an auxiliary elastic member extending in the same direction as said vehicle springs and means adjustable on the vehicle spring for forcibly holding the ends of said auxiliary member away from said vehicle springs.

2. The combination with a spring for vehicles of an auxiliary elastic member extending in the same direction as said vehicle spring and means interposed between said spring and auxiliary member and adjustable on said vehicle spring for forcibly holding the ends of said auxiliary member away from said vehicle spring.

3. The combination with a spring for vehicles, of an auxiliary elastic member extending in the same direction as said vehicle spring, and a clip comprising clip-plates one of which has a pair of corresponding stepped lugs projecting therefrom and a yoke seated on said steps and provided with tightening nuts on its ends.

4. A resistance creating device for protecting a vehicle spring from excessive compression and excessive rebound, consisting of a flat spring member held in tension by an adjustable attachment on said vehicle spring when the vehicle spring is at rest, which tension is released by the compression of the vehicle spring to a certain point whereupon it is exerted in opposition to excessive compression thereof, said spring member being adapted to release its tension on the rebound of said vehicle spring until the latter reaches a given point, whereupon it is exerted to oppose the further rebound of said vehicle spring.

5. The combination with springs for vehicles of an auxiliary spring the normal tension of which substantially corresponds to the tension of the vehicle-springs, and a plate adjustably secured to the vehicle-springs that separates the ends of said auxiliary spring from the vehicle-springs whereby the tension of the former is increased.

6. Vehicle-springs comprising main-springs connected to the body and axle of the vehicle, auxiliary springs of corresponding tension connected to said axle, and means for spreading the ends of said main and auxiliary springs consisting of a pair of clamping-plates adjustably secured to one of said springs having stepped portions arising from the face of one of said plates, and a yoke seated on a pair of opposite steps and clamped below the opposite plate the portion of said yoke between its supports affording a rest for the opposite spring.

In testimony whereof I have hereunto set my hand and seal this 23rd day of October, A. D., 1907.

GEORGE N. SCOTT. [L. S.]

Witnesses:
 FRANK D. THOMASON.
 E. K. LUNDY.